(12) United States Patent
Kim

(10) Patent No.: US 6,854,191 B2
(45) Date of Patent: Feb. 15, 2005

(54) ALIGNMENT LASER PROJECTION SYSTEM

(76) Inventor: Kyung Cheol Kim, Gwaebeop-dong, Sasang-gu, Busan (KR)

( * ) Notice: Subject to any disclaimer, the term of this patent is extended or adjusted under 35 U.S.C. 154(b) by 0 days.

(21) Appl. No.: 10/701,980

(22) Filed: Nov. 4, 2003

(65) Prior Publication Data

US 2004/0255478 A1 Dec. 23, 2004

(30) Foreign Application Priority Data

Jun. 19, 2003 (KR) .............................. 10-2003-0039630

(51) Int. Cl.[7] .............................................. G01C 15/00
(52) U.S. Cl. ..................... 33/286; 33/DIG. 21; 33/227; 33/282
(58) Field of Search .................. 33/286, 282, 227–228, 33/DIG. 21, 557

(56) References Cited

U.S. PATENT DOCUMENTS

| | | | | |
|---|---|---|---|---|
| 4,333,242 A | * | 6/1982 | Genho, Sr. .................. | 33/227 |
| 5,381,258 A | * | 1/1995 | Bordignon et al. ......... | 359/202 |
| 6,178,650 B1 | * | 1/2001 | Thibodeaux .................. | 33/286 |
| 6,265,984 B1 | * | 7/2001 | Molinaroli ............... | 340/815.4 |
| 6,347,457 B1 | * | 2/2002 | Espinoza et al. ............. | 33/288 |

* cited by examiner

Primary Examiner—Diego Gutierrez
Assistant Examiner—Yaritza Guadalupe
(74) Attorney, Agent, or Firm—Lee, Hong, Degerman, Kang & Schmadeka

(57) ABSTRACT

A laser projection system capable of irradiating a light beam for alignment is provided. The alignment laser projection system comprises a reflection unit, a moving reflection unit, irradiation units that irradiate light to the reflection unit and the moving reflection unit, a guide unit which drives the moving reflection unit, a housing which contains a driving unit, a control unit which controls the irradiation unit and the driving unit, and a display unit which displays control states. In irradiating a laser beam, the laser projection system resolves the problem of instable power supply and information transfer due to the damage in a cable apparatus caused by alternating movements of an irradiation unit such that it supplies stable alignment line in repetitive works.

25 Claims, 7 Drawing Sheets

ALIGNMENT LASER PROJECTION SYSTEM

BACKGROUND OF THE INVENTION

1. Field of the Invention

The present invention relates to a laser projection system, and more particularly, to an alignment laser projection system which can accurately align; working lines without being affected by interference that can occur internally during the working process of a machine tool.

2. Description of the Related Art

In order to construct an external ship body or an internal structure in a large structure such as a ship, a very wide steel plate is needed, but it is impossible in reality to produce such a wide steel plate. Accordingly, for that purpose, a plurality of steel plates of a predetermined area are joined by welding and then used.

Meanwhile, if the welding parts of steel plates are not accurately joined in a predetermined allowable error range, the strength of a predetermined part of a ship body produced based on the welding can be relatively weaker than other parts and due to this, the ship body may be broken. Accordingly, the welding between joining steel plates should be performed after an accurate welding line is formed.

However, the area of each steel plate joined by welding is also much wider than an ordinary area of a steel plate such that it is difficult to apply normal welding line forming methods, such as those using worker's eye measure or a measuring tape. Accordingly, in this case, a laser projection system shown in FIGS. 1 and 2 is used for the alignment.

Generally, a laser projection system 1 comprises a housing 40 internally which has a laser irradiation unit, a driving unit container 50 which is coupled to one side of the housing 40 and internally has a driving unit 52, an encoder container 60 which is coupled to the other side of the housing 40 and internally has an encoder 62, a control unit 70 which is connected to the driving unit 52 and the encoder 62 and controls the driving unit 52, and a display 80 which displays the situation controlled by the control unit 70.

Inside the housing 40, disposed are a ball screw 20 which can be extended or contracted in the direction from the center to either side with being held through penetration holes (not shown) formed on both sides of the housing 40, a first irradiation unit 32 which is fixed to the center of the ball screw 20, and at least one pair or more of second irradiation units 34 and 36 which are coupled to the ball screw 20 at symmetrical locations about the first irradiation unit 32. Cables 33, 35, and 37 are connected to the first and second irradiation units 32, 34 and 36, respectively.

As the first and second irradiation units 32, 34, and 36, normal laser units are used respectively.

The cables 33, 35, and 37 provide power from a power supply unit to the first and second irradiation units 32, 34, and 36, respectively. In addition, the first and second irradiation units 32, 34, and 36 transmit information on respective moving distances to the control unit 70.

The driving unit 52 is connected to one end of the ball screw 20 to extend or contract the ball screw and for this a stepping motor is usually employed.

The encoder 60 is connected to the other end of the ball screw 20, and if the ball screw 20 is extended or contracted by the driving unit 52, transmits information on this moving distance to the control unit 70.

The control unit 70 controls start and end of operation of the driving unit 50, and the driving range, receives information on the moving distance of the ball screw 20 measured by the encoder 60, and displays the control situation for these on the display 80. An ordinary terminal or CPU with a control function corresponds to this unit 70.

The display 80 displays the situation controlled by the control unit 70. An ordinary monitor corresponds to this, and of course, a touch screen can also, be used.

In the operation of the laser projection system having the structure described above, first, objects desired to be welded (A, B, C, D) are placed below or beside the laser projection system. Then, from the external power supply unit (not shown) through the respective cables 33, 35, and 37, power is supplied to the first and second irradiation units 32, 34, and 36 connected to the, respective cables 33, 35, 37.

If power is supplied, light beams irradiated by the first and second irradiation units 32, 34, and 36 accurately indicate straight welding lines between the objects to be welded (A, B, C, D), and according to this, a worker performs welding work using a welder 90 and so on.

Meanwhile, in order to form an accurate welding line, if the driving unit 52 is driven, the ball screw 20 connected to the driving unit 52 is extended or contracted from the first irradiation unit 32 to the right-hand side or left-hand side. According to this, a pair of the second irradiation units 34 and 36 coupled to the ball screw 20 move to the right or to the left such that an accurate welding line can be adjusted and along thus aligned welding line, the welder welds the objects and then the desired structure can be produced.

However, when the prior art laser projection system with the structure described above are frequently used in welding fields, the ball screw 20 is extended or contracted particularly by the driving unit 52, and according to this, the cables 35 and 37 connected to the second irradiation units 34 and 36 among the first and second irradiation units 32, 34, and 36, which move together with the ball screw 20, frequently contacts with an inner wall surface of the housing 40 such that the cables 36 and 37 are frequently damaged.

These damages of the cables cause error in the location information of the irradiation units transmitted to the control unit through the cables such that it becomes impossible to align an accurate welding line originally desired and when the welding work is completed, this can directly cause serious damages to the finished structure.

In addition, it causes difficulties in providing power to respective irradiation units from the external power supply unit or a laser beam desired to irradiate itself is not generated. Accordingly, the laser projection system should be regularly inspected and frequently replaced and this becomes one of major factors for deterioration of the entire productivity.

This problem also occurs identically in all cases where a laser projection system with the identical structure is needed for more accurate position alignment, such as when the laser projection system is used for position alignment in manufacturing tires, and when an iron plate is manufactured in a predetermined shape after a blast furnace process.

SUMMARY OF THE INVENTION

The present invention provides a laser projection system which can form an alignment line at a desired accurate location even when a ball screw is frequently extended or contracted by a driving unit.

The present invention also provides a more economical laser projection system which can form a more accurate alignment line with a simpler structure.

According to an aspect of the present invention, there is provided an alignment laser projection system comprising: a housing wherein both sides of the housing are open and a permeation window is formed in the length direction at the bottom of the housing; a first side surface holding plate wherein an upper hole and a center hole are formed such that the central axis of each hole is the same as the central axis line in the length direction of the permeation window, and a pair of bottom holes are formed such that the central axis of each hole is in parallel with and level with the axis line in the length direction of the permeation window, and the two axes of the holes are symmetrical about the axis line of the permeation window, and the first side surface holding plate is coupled to one side surface of the housing: a second side surface holding plate where holes corresponding the upper hole and bottom holes of the first side surface holding plates are formed respectively and the second side surface holding plate is coupled to the other side of the housing; a center holding plate wherein holes corresponding to each of bottom holes of the first and second side surface holding plates are formed and the center holding plate is coupled to the inner center of the housing; a reflection unit which penetrates into and is coupled to each upper hole of the first and second side surface holding plates; a guide unit formed with a ball screw and a guide rod wherein both ends of each of the ball screw and the guide rod penetrate into and are coupled to respectively bottom holes of the first and second side surface holding plates; a pair or more of guide blocks which are disposed on locations symmetrical about the center holding plate, wherein the guide unit penetrates into and is coupled to a pair or more of the guide blocks; a driving unit which is coupled to one end of the ball screw and drives the ball screw; an encoder which is coupled to the other end of the ball screw and detects information on the movement of the ball screw; a first irradiation unit which is inserted into a central hole of the first side surface holding plate and irradiates light; a moving reflection unit which is coupled to a coupling member on the top of each guild block and protrudes above the central axis line of the permeation window in the length direction; a second irradiation unit which is coupled to the center holding plated by a coupling member and protrudes above the central axis line of the permeation window in the length direction; and a control unit which is connected to the driving unit, the encoder, and the first and second irradiation units and controls the same.

According to another aspect of the present invention, there is provided an alignment laser projection system comprising: a housing wherein both sides of the housing are open and a permeation window is formed in the length direction at the bottom of the housing; a first side surface holding plate wherein an upper hole is formed such that the central axis of the hole is the same as the central axis line in the length direction of the permeation window, and a pair of bottom holes are formed in the vertical direction on one location selected between two locations where the central axis of a lower bottom hole of the pair is in parallel with and level with the center of the axis line in the length direction of the permeation window and the first side surface holding plate is coupled to one side surface of the housing; a second side surface holding plate where holes corresponding the upper hole and bottom holes of the first side surface holding plates are formed respectively and the second side surface holding plate is coupled to the other side of the housing; a center holding plate wherein holes corresponding to each of bottom holes of the first and second side surface holding plates are formed and the center holding plate protrudes to the center from an inside side surface perpendicularly facing the length axis line of the permeation window, and is coupled to the inner center of the housing; a reflection unit which penetrates into and is coupled to each upper hole of the first and second side surface holding plates; a guide unit formed with a ball screw and a guide rail wherein both ends of each of the ball screw and the guide rail penetrate into and are coupled to respectively bottom holes of the first and second side surface holding plates; a pair or more of first guide blocks which are disposed on locations symmetrical about the center holding plate, wherein the ball screw of the guide unit penetrates into and is coupled to a pair or more of the guide blocks; a second guide block which is coupled to the bottom of each of the first guide blocks and slides along the guide rail; a driving unit which is coupled to one end of the ball screw and drives the ball screw; an encoder which is coupled to the other end of the ball screw and detects information on the movement of the ball screw; a moving reflection unit which is coupled to a coupling member on the top of each guild block and protrudes above the central axis line of the permeation window in the length direction; a second irradiation unit which is coupled to the center holding plated by a coupling member and is disposed above the central axis line of the permeation window in the length direction; a first irradiation unit which is inserted into a central hole of the first side surface holding plate and irradiates light; and a control unit which is connected to the driving unit, the encoder, and the first and second irradiation units and controls the same.

The penetration coupling of the ball screw and the guide block; a ball screw nut is used as a medium such that the rotational movement of the ball screw is converted into the rectilinear movement of the guide block.

Also, in the penetration coupling of the ball screw and the first guide block, a ball screw nut is used as a medium such that the rotational movement of the ball screw is converted into the rectilinear movement of the guide block.

The guide rail and the second guide block are an LM rail and an LM block, respectively.

The housing is one selected among a cylinder, a rectangular pillar and a polygonal pillar.

The permeation window of the housing is formed as a slit, or is tightly closed by a transparent material.

The reflection unit is formed with a photo conductive drum with an embedded reflection plate.

The ball screw is extended or contracted in both side directions, at the same time, from the center holding plate by the operation of the driving unit.

The driving unit is a motor.

The second irradiation unit is formed with a moving reflection unit.

The first and second irradiation units are laser units.

The moving reflection unit is formed with a prism.

The control unit further comprises a display to display a situation being controlled.

The display is formed with a touch screen.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
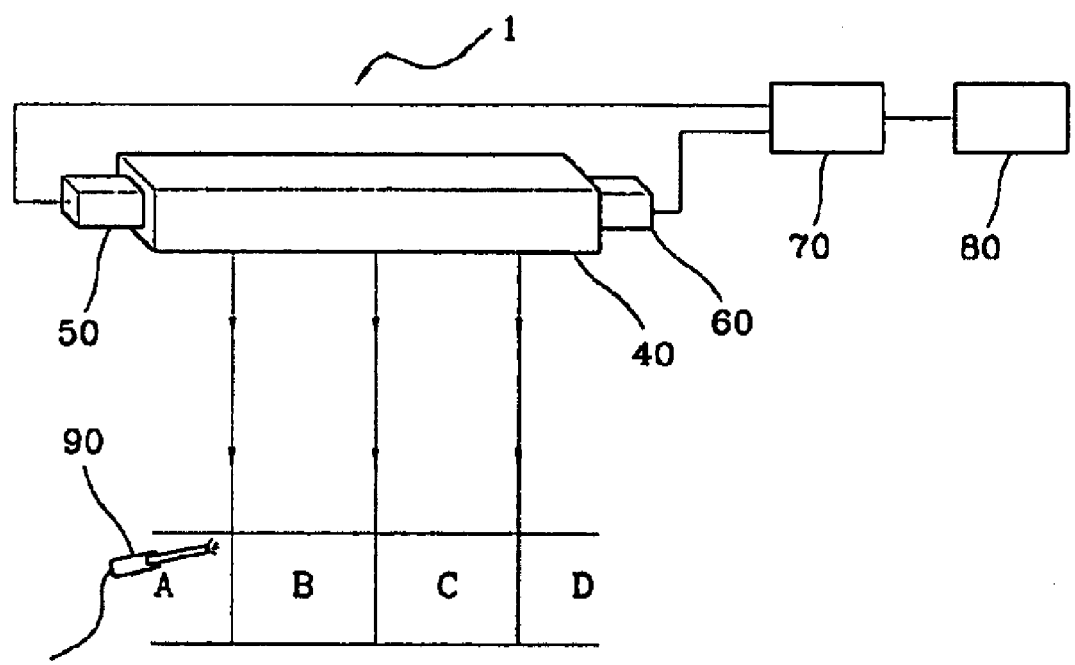
FIG. 1 is a diagram of the entire structure of the prior art alignment laser projection system.
Figure 2:
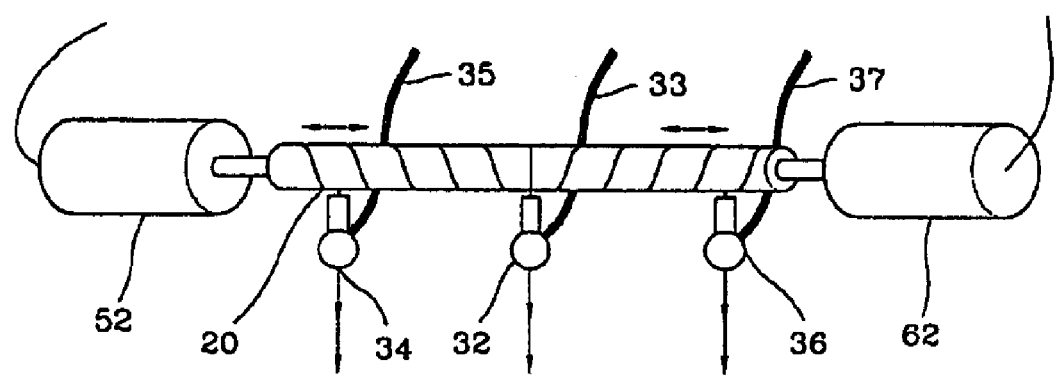
FIG. 2 is a detailed diagram of the structure of the prior art alignment laser projection system.
Figure 3:
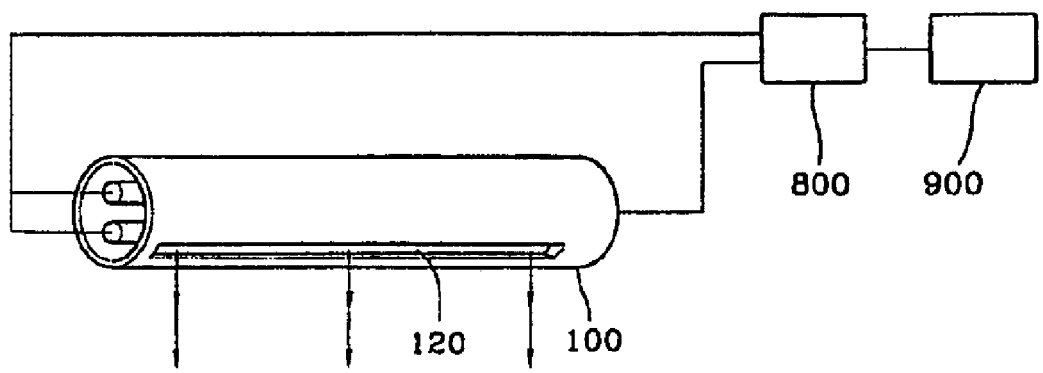
FIG. 3 is a diagram of the entire structure of an alignment laser projection system according to the present invention.
Figure 4:
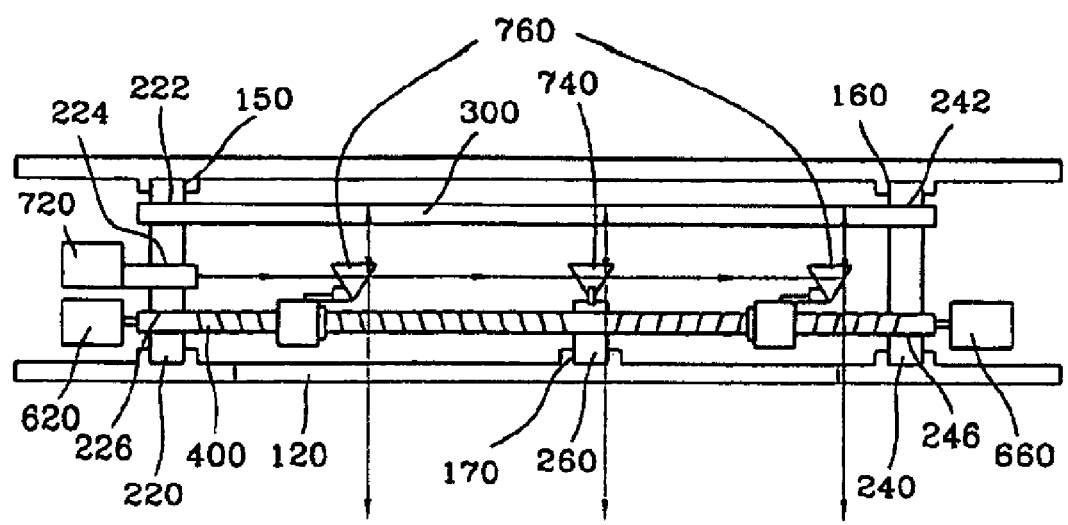
FIG. 4 is a detailed sectional view of an alignment laser projection system as a first preferred embodiment according to the present invention.
Figure 5:
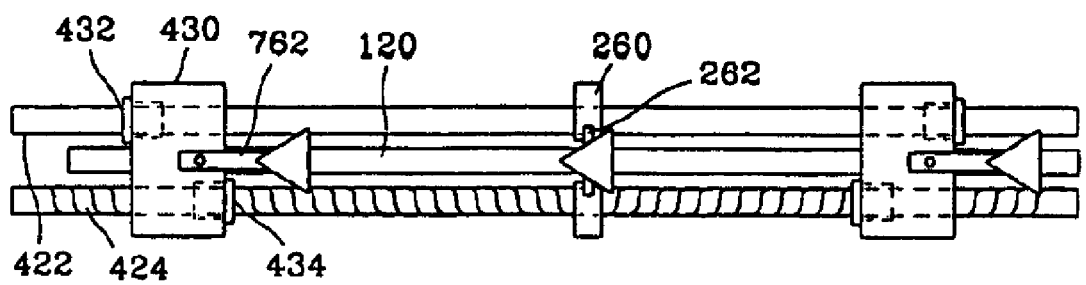
FIG. 5 is a detailed plan view of an alignment laser projection system as the first preferred embodiment according to the present invention.

FIGS. 3 through 5 are a diagram of the entire structure, a detailed sectional view, and a detailed plan view, respectively, of a first preferred embodiment of a laser projection system according to the present invention.

The present invention basically comprises a housing 100 which contains a variety of apparatuses, a control unit 800 which controls the variety of apparatuses inside the housing 100, a display 900 which displays a situation controlled by the control unit 800.

Both sides of the housing 100 are open and on the bottom of the housing 100, a permeation window 120 is formed in the length direction.

The permeation window 120 may be formed as a slit of a recess shape, or the recess shape slit may be closed with a transparent material. If only light can permeate through the permeation window 120, any shape or material can be used.

Preferably, the permeation window 120 is formed to be shorter than the entire length of the housing 100 as shown, but of course, it can be formed the same as the entire length of the housing 100.

Meanwhile, preferably, the shape of the housing is formed in a cylinder shape, but not limited to this, and it is obvious that the shape of the housing 100 can be any one selected among rectangular and polygonal pillars.

The reference numbers 150, 160, and 170, which are not described yet, indicate insertion grooves in protrusions protruding toward the central axis line of the housing 100 from the inner side surfaces so that a first side holding plate, a second side holding plate, and a center holding plate that will be explained later can be inserted and fixed.

To both the open sides of the housing, the first side surface holding plate 220 and the second side surface holding plate 240 are coupled and the center holding plate 260 is coupled to the internal center.

On the first side holding plate 220, an upper hole 222, a center hole 224, and a pair of bottom holes 226 are formed.

The upper hole 222 and the center hole 224 are formed such that the central axis of each hole is the same as the central axis line in the length direction of the housing permeation window 120. A pair of the bottom holes 226 are formed such that the central axis of each hole is in parallel with and level with the axis line in the length direction of the housing permeation window 120, and the two axes of the holes are symmetrical about the axis line of the permeation window 120.

That is, when both side surfaces of the housing 100 are taken as a base and if the permeation window 120 is at the bottom of the housing 110, the upper hole 222 and the center hole 224 are formed respectively on a diameter line drawn in the upper direction from the permeation window 120, and a pair of the bottom holes 226 are formed on an even level and on the right hand side and on the left hand side of the diameter line.

On the second side surface holding plate 240, an upper hole 242 and a pair of bottom holes 246 corresponding to the upper hole 222 and a pair of the bottom holes 226 of the first side surface holding plate 220 are formed respectively.

The center holding plate 260 comprises a first holding plate and a second holding plate, which are protruding from inside side surfaces of the housing 100 in the central axis line direction of the housing 100 to face each other. In each of the first and second holding plates, holes corresponding to the bottom holes 224 and 226 of the first and second side surface holding plates 220 and 240 are formed.

Preferably, the shape of each holding plate is a fan shape and the part adjacent to the permeation window 120 is formed to be concave.

Inside the housing 100 according to the present invention, disposed are a guide unit 400, a guide block 430 which is coupled with the guide unit 400, first and second irradiation units 720 and 740, a driving unit 620 which drives the guide unit 400, an encoder 660 which measures movement of the guide unit 400, and a moving reflection unit 760 and a reflection unit 300 that reflect light irradiated by the first irradiation unit 720.

The guide unit 400 comprises a ball screw 424 and a guide rod 422 that are level with each other. The ball screw 424 has an operation structure by which the ball screw 424 can be extended or contracted in both directions (the left hand side and right hand side in the figure) from the center of the housing 100 where the center holding plate 260 is disposed, which is well known in the art and detailed explanation will be omitted.

The guide rod 422 prevents the guide block 430, which will be explained later, from rotating together according to the rotational movement of the ball screw 424, and allows the guide block 430 to perform rectilinear movement along a predetermined straight line axis.

Meanwhile, the guide rod 422 and the ball screw 424 penetrate into and are coupled to a pair of holes formed in each of the first and second side surface holding plates 220 and 240.

A pair of penetration holes (not shown) are formed on both sides of the guide block 430 facing to each other so that the guide rod 422 and the ball screw 424 forming the guide unit 400 can penetrate into and be coupled to the holes. Preferably, a pair or more of the guide blocks 430 facing each other on symmetrical locations about the center holding plate 170 are coupled to the guide unit 400.

In addition, it is desirable that by using a ball screw nut 434 as a medium, the guide block 430 and the ball screw 424 are coupled. This is because by the movement of a ball embedded in the ball screw nut 434, the rotational movement of the ball screw 424 can be converted into the rectilinear movement of the guide block 430, and in addition, the rectilinear movement of the guide block 430 can be implemented smoothly and precisely.

Together with this, it is desirable that for smooth movement of the guide rod 422, a separate guide rod coupling member 432 is used as a medium also for coupling the guide block 430 and the guide rod 433.

The moving reflection unit 760 is to reflect light irradiated by the first irradiation unit 720, which will be explained later, and is coupled to the upper part of the guide block 430 by a separate coupling member 762. In a state where the center of the moving reflection unit 760 corresponds to the axis line center of the housing permeation window 120 in the length direction, the moving reflection unit 760 protrudes over the permeation window 120.

If only the moving reflection unit 760 can reflect light appropriately, it can be implemented not limited by any one type, but it is desirable that it is implemented by a prism. The protruding location may be either of the left hand side and the right hand side of the guide block 430.

Of course, the kind of the coupling member 762 and the coupling method are not limited to any one and can be selected from a variety of types and methods.

Meanwhile, though only a pair of moving reflection units (including the guide block) on locations facing each other are shown in the figure, the number of moving reflection units can be changed in a variety of ways according to the conditions of a desired work field. Accordingly, when necessary, one or more pairs of moving reflection units, or a plurality of moving reflection units with the number of moving reflection units in one direction bigger than the number of moving reflection units in other direction can be formed.

The first irradiation unit 720 is a unit to irradiate light and an ordinary laser unit corresponds to this. The first irradiation unit 720 is inserted into and coupled to the center hole 224 of the first side surface holding plate 220 and is connected to the control unit 800, which will be explained later, through a separate cable.

The second irradiation unit 740 is a separate irradiation unit to irradiate light and in the present invention, instead of the second irradiation unit 740, the moving reflection unit described above can also be used. When a separate irradiation unit is used as the second irradiation unit 740, it will have the same structure and connection as the first irradiation unit 720 described above, and when the moving reflection unit is used as the second irradiation unit 740, it will have the same structure as the moving reflection unit 760 described above.

The driving unit 620 is coupled to one end of the ball screw 424 of the guide unit 400 to drive the ball screw 424. Preferably, a stepping motor is used as the driving unit 620, but not limited to this and any ordinary motor can be used.

The encoder 660 is coupled to the other end of the ball screw 424 of the guide unit 400 and is an apparatus to accurately detects such information as the rotation speed of the ball screw 424, and to feed the information back to the control unit 800. An ordinary optical encoder corresponds to this and is well known in the art. Accordingly, the detailed explanation will be omitted.

The reflection unit 300 reflects again light to the outside through the housing permeation window 120, the light which is irradiated by the first irradiation unit 720 (if the second irradiation unit is a separate irradiation unit, the second irradiation unit is also included) and then reflected by the moving reflection unit. This re-reflection of light is conducted by a reflection plate (not shown) embedded in the reflection unit 300.

The material and shape of the reflection plate are not limited to specific ones if only with a high reflection rate it can reflect most of irradiated light.

In addition, it is desirable that the reflection unit 300 is made with a photo conduct drum. The reflection unit 300 penetrates into and are coupled to each bottom hole 222 of the first and second side surface holding plates 220 and 240.

The control unit 800 controls the first and second irradiation units 720 and 740 (when the second irradiation unit is formed as a moving reflection unit, the first irradiation unit), the driving unit 620, and the encoder 660. An ordinary terminal with an embedded CPU corresponds to this.

The display 900 displays the operational situation controlled by the control unit 800. Of course, a touch screen that can control through direct contact by a user to the screen, as well as an ordinary display corresponds to this.

Figure 6:
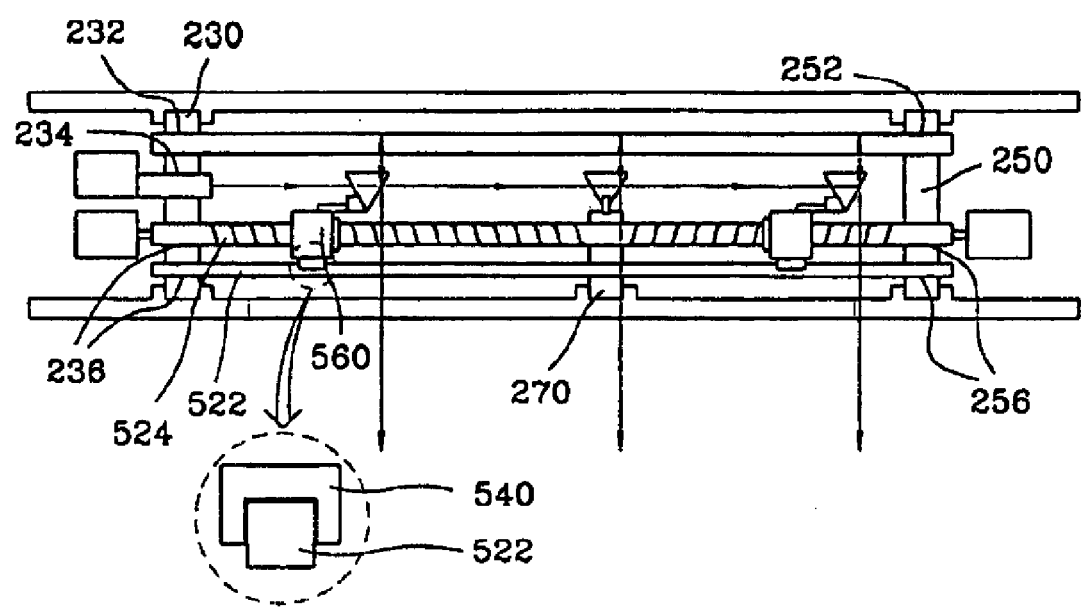
FIG. 6 is a detailed sectional view of an alignment laser projection system as a second preferred embodiment according to the present invention.
Figure 7:
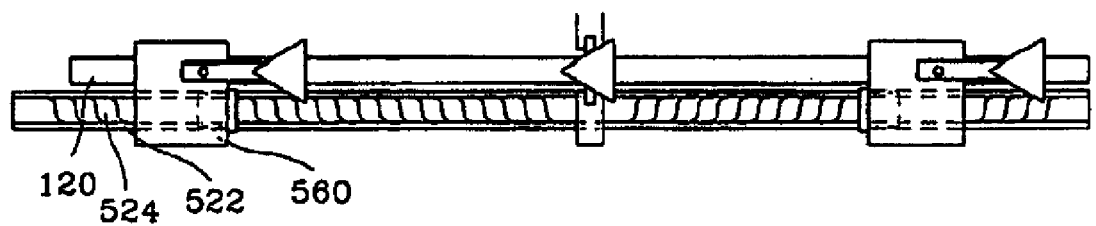
FIG. 7 is a detailed plan view of an alignment laser projection system as the second preferred embodiment according to the present invention.

Meanwhile, FIGS. 6 and 7 are a detailed sectional view and a detailed plan view, respectively, of an alignment laser projection system as a second preferred embodiment according to the present invention. Focusing on only those parts of the structure, which are different from the first embodiment described above, the second embodiment will now be explained.

On the first side surface holding plate 230, an upper hole 232, a center hole 234, and a pair of bottom holes 236 are formed. The upper hole 232 and the center hole 234 are the same as in the first embodiment. A pair of the bottom holes 236 are formed in the vertical direction on one location selected between two locations where the central axis of a lower bottom hole of the pair 236 is in parallel with and level with the center of the axis line in the length direction of the housing permeation window 120.

That is, when both side surfaces of the housing 100 are taken as a base and if the permeation window 120 is at the bottom of the housing 110, the two holes 236 are formed vertically on one location selected between the left hand side and right hand side from a diameter line drawn in the upper direction from the permeation window 120.

On the second side surface holding plate 250, an upper hole 252 and a pair bottom holes 256 corresponding to the upper hole 232 and a pair of bottom holes 236, respectively, of the first side surface holding plate 230 are formed.

On the center holding plate 270, holes corresponding to each of the bottom holes 236 and 256, respectively, of the first and second side surface holding plates 230 and 250 are formed.

A guide unit disposed inside the housing comprises a ball screw 524 on the top and a guide rail 522 at the bottom, and penetrates into and is coupled to each of the bottom holes 236 and 256 of the first and second side surface holding plates 230 and 250.

The ball screw 524 penetrates into and is coupled to the first guide block 560, and the bottom part of the first guide block 560 is coupled with a second guide block 540 which slides along the top surface of the guide rail 522.

That is, with the first and second guide blocks 560 and 540 being coupled with each other, the first guide block 560 moves along the ball screw 524 and the second guide block 540 slides along the guide rail 522.

Using a ball screw nut as a medium for coupling the first guide block 560 and the ball screw 524 is the same as in the first embodiment. Of course, the coupling method of the first and second guide blocks 560 and 540 may be selected among a variety of ways.

Meanwhile, it is desirable to use an ordinary LM guide formed with an LM block and an LM rail for the second guide block 540 and the guide rail 522, respectively, because it can reduce friction in sliding and at the same time guarantee precise movement.

The remaining part of the structure of the second embodiment that is not described is the same as in the first embodiment and therefore the detailed description will be omitted.

Referring to the attached figures, the operation of the laser projection system according to the present invention having the structure described above will now be explained.

First, when power from an external power supply unit is supplied to the first and second irradiation units 720 and 740 (if the second irradiation unit is formed as a moving reflection unit, the first irradiation unit) and light is irradiated, the light irradiated by the second irradiation unit 740 is directly incident on the reflection unit 300, and the light irradiated by the first irradiation unit 720 is reflected by the moving reflection unit 760 (if the second irradiation is formed as a moving reflection unit, the light irradiated by the first irradiation unit is all reflected on the moving reflection unit) and with the changed irradiation direction, is incident on the reflection unit 300.

The light irradiated to the reflection unit 300 is reflected by the reflection plate embedded in the reflection unit 300 and its irradiation direction is changed (the arrow direction in FIGS. 4 through 6) such that an alignment line is formed. If the light lines by the respective moving reflection units 760 do not match with a desired alignment line when the first irradiation unit 720 is taken as a base, the user can manipulate the control unit 800 so that the control unit 800 drives the driving unit 620 in one direction to rotate the ball screw 424. Then, the rotation movement of the ball screw 424 is converted into the rectilinear movement of the guide block 430 and the moving reflection unit 760 comes close to or goes away from the center holding plate 260 of the housing 100. According to this, the alignment line can be again adjusted accurately.

Even if the alignment line by the respective moving reflection units 760 do not match with a desired line, the user can drive the driving unit 620 in the reverse direction such that the line is appropriately adjusted.

Meanwhile, the control unit 800 displays information on the strength of the light irradiated by each of the irradiation units, information on the operation of the driving unit 620, and information analyzed by the encoder 660 on the display 900 connected to the control unit 800. If a touch screen is used as the display, the operation situation of the entire system can be controlled more precisely by the user checking the situation with the user's naked eye.

Optimum embodiments have been explained above and are shown. However, the present invention is not restricted to the above-described embodiments and many variations are possible within the spirit and scope of the present invention. The scope of the present invention is not determined by the above description but by the accompanying claims.

According to the present invention, for irradiation of an alignment laser beam, an irradiation unit which moves in a predetermined distance is formed with moving reflection units and a reflection unit and the accompanying cables are removed such that instability of power supply and information transfer due to damages in the cables is removed and a stable alignment line can be provided in repetitive works.

In addition, in the prior art a plurality of irradiation units disposed in the housing and directly irradiating lights should be used, but in the present invention, even when only one irradiation unit is used, a desired purpose can be well achieved such that the entire system is more economically constructed.

What is claimed is:

1. An alignment laser projection system comprising:
   a housing wherein both sides of the housing are open and a permeation window is formed in the length direction at the bottom of the housing;
   a first side surface holding plate wherein an upper hole and a center hole are formed such that the central axis of each hole is the same as the central axis line in the length direction of the permeation window, and a pair of bottom holes are formed such that the central axis of each hole is in parallel with and level with the axis line in the length direction of the permeation window, and the two axes of the holes are symmetrical about the axis line of the permeation window and the first side surface holding plate is coupled to one side surface of the housing;
   a second side surface holding plate where holes corresponding the upper hole and bottom holes of the first side surface holding plates are formed respectively and the second side surface holding plate is coupled to the other side of the housing;
   a center holding plate wherein holes corresponding to each of bottom holes of the first and second side surface holding plates are formed and the center holding plate is coupled to the inner center of the housing;
   a reflection unit which penetrates into and is coupled to each upper hole of the first and second side surface holding plates;
   a guide unit formed with a ball screw and a guide rod wherein both ends of each of the ball screw and the guide rod penetrate into and are coupled to respectively bottom holes of the first and second side surface holding plates;
   a pair or more of guide blocs which are disposed on locations symmetrical about the center holding plate, wherein the guide unit penetrates into and is coupled to a pair or more of the guide blocks;
   a driving unit which is coupled to one end of the ball screw and drives the ball screw;
   an encoder which is coupled to the other end of the ball screw and detects information on the movement of the ball screw;
   a first irradiation unit which is inserted into a central hole of the fist side surface holding plate and irradiates light;
   a moving reflection unit which is coupled to a coupling member on the top of each guild block and protrudes above the central axis line of the permeation window in the length direction;
   a second irradiation unit which is coupled to the center holding plated by a coupling member and protrudes above the central axis line of the permeation window in the length direction; and
   a control unit which is connected to the driving unit the encoder, and the first and second irradiation units and controls the same.

2. The alignment laser projection system of claim 1, wherein in the penetration coupling of the ball screw and the guide block, a ball screw nut is used as a medium such that the rotational movement of the bell screw is converted into the rectilinear movement of the guide block.

3. The alignment laser projection system of claim 1, wherein the housing is one selected among a cylinder a rectangular pillar and a polygonal pillar.

4. The alignment laser projection system of claim 1 wherein the permeation window of the housing is formed as a sift of a recess shape, or the slit of a recess shape is tightly closed by a transparent material.

5. The alignment laser projection system of claim 1, wherein the reflection unit is formed with a photo conductive drum with an embedded reflection plate.

6. The alignment laser projection system of claim 1, wherein the ball screw is extended or contracted in both side directions, at the same time, from the center holding plate by th operation of th driving unit.

7. The alignment laser projection system of claim 1, wherein the driving unit is a motor.

8. The alignment laser projection system of claim 1, wherein the second irradiation unit is formed with a moving reflection unit.

9. The alignment laser projection system of claim 1, wherein the first and second irradiation units are laser units.

10. The alignment laser projection system of claim 1, wherein the moving reflection unit is formed with a prism.

11. The alignment laser projection system of claim 1, wherein the control unit further comprises a display to display a situation being controlled.

12. The alignment laser projection system of claim 11, wherein the display is formed with a touch screen.

13. An alignment laser projection system comprising:
- a housing wherein both aides of the housing are open and a permeation window is formed in the length direction at the bottom of the housing;
- a first side surface holding plate wherein an upper hole is formed such that the central axis of the hole is the same as the central axis line in the length direction of the permeation window, and a pair of bottom holes are formed in the vertical direction on one location selected between two locations where the central axis of a lower bottom hole of the pair is in parallel with and level with the center of the axis line in the length direction of the permeation window and the first aide surface holding plate is coupled to one side surface of the housing;
- a second side surface holding plate where holes corresponding the upper hole and bottom holes of the first side surface holding plates are formed respectively and the second side surface holding plate is coupled to the other side of the housing;
- a center holding plate wherein holes corresponding to each of bottom holes of the first and second side surface holding plates are formed and the center holding plate protrudes to the center from an inside side surface perpendicularly facing the length axis line of the permeation window, and is coupled to the inner center of the housing;
- a reflection unit which penetrates into and is coupled to each upper hole of the first and second side surface holding plate;
- a guide unit formed with a ball screw and a guide rail wherein both ends of each of the ball screw and the guide rail penetrate into and are coupled to respectively bottom holes of the first and second side surface holding plates;
- a pair or more of first guide blocks which are disposed on locations symmetrical about the center holding plate, wherein the ball screw of the guide unit penetrates into and is coupled to a pair or more of the guide blocks;
- a second guide block which is coupled to the bottom of each of the first guide blocks and slides along the guide rail;
- a driving unit which is coupled to one end of the ball screw and drives the ball screw;
- an encoder which is coupled to the other end of the ball screw and detects information on the movement of the ball screw;
- a moving reflection unit which is coupled to a coupling member on the top of each guild block and protrudes above the central axis line of the permeation window in the length direction;
- a second irradiation unit which is coupled to the center holding plated by a coupling member and is disposed above the central axis line of the permeation window in the length direction;
- a first irradiation unit which is inserted into a central hole of the first side surface holding plate and irradiates light; and
- a control unit which is connected to the driving unit, the encoder, and the first and second irradiation units and controls the same.

14. The alignment laser projection system of claim 13, wherein in the penetration coupling of the ball screw and the first guide block, a ball screw nut is used as a medium such that the rotational movement of the ball screw is converted into the rectilinear movement of the guide block.

15. The alignment laser projection system of claim 13, wherein the guide rail and the second guide block are an LM rail and an LM block, respectively.

16. The alignment laser projection system of claim 13, wherein the housing is one selected among a cylinder, a rectangular pillar and a polygonal pillar.

17. The alignment laser projection system of claim 13, whereon the permeation window of the housing is formed as a slit of a recess shape, or the slit of a recess shape is tightly closed by a transparent material.

18. The alignment laser projection system of claim 13, wherein the reflection unit is formed with a photo conductive drum with an embedded reflection plate.

19. The alignment laser projection system of claim 13, wherein the ball screw is extended or contracted in both side directions, at the same time, from the center holding plate by the operation of the driving unit.

20. The alignment laser projection system of claim 13, wherein the driving unit is a motor.

21. The alignment laser projection system of claim 13, wherein the second irradiation unit is formed with a moving reflection unit.

22. The alignment laser projection system of claim 13, wherein the first and second irradiation units are laser units.

23. The alignment laser projection system of claim 13, wherein the moving reflection unit is formed with a prism.

24. The alignment laser projection system of claim 13, wherein the control unit further comprises a display to display a situation being controlled.

25. The alignment laser projection system of claim 24, wherein the display is formed with a touch screen.

* * * * *